United States Patent
Woodell et al.

(10) Patent No.: US 7,417,578 B1
(45) Date of Patent: Aug. 26, 2008

(54) REMOVAL OF SPURIOUS AIRCRAFT DETECTIONS ON WEATHER RADAR

(75) Inventors: Daniel L. Woodell, Cedar Rapids, IA (US); Roy E. Robertson, Marion, IA (US); Charles J. Dickerson, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 630 days.

(21) Appl. No.: 11/074,531

(22) Filed: Mar. 8, 2005

(51) Int. Cl.
*G01S 13/95* (2006.01)

(52) U.S. Cl. .................................. 342/26 R; 342/26 B

(58) Field of Classification Search ............... 342/26 R, 342/26 A, 26 B, 26 C, 26 D, 159, 179
See application file for complete search history.

(56) References Cited

U.S. PATENT DOCUMENTS

| | | | | |
|---|---|---|---|---|
| 4,649,388 A | * | 3/1987 | Atlas ........................ | 342/26 D |
| 5,175,551 A | * | 12/1992 | Rubin ..................... | 342/26 D |
| 5,359,330 A | * | 10/1994 | Rubin et al. .............. | 342/26 D |
| 6,034,760 A | * | 3/2000 | Rees ......................... | 356/28.5 |
| 6,424,288 B1 | | 7/2002 | Woodell ................... | 342/26 R |
| 6,603,425 B1 | | 8/2003 | Woodell ................... | 342/26 R |
| 6,879,280 B1 | * | 4/2005 | Bull et al. ................. | 342/26 B |
| 7,109,912 B1 | * | 9/2006 | Paramore et al. .......... | 342/26 B |
| 7,109,913 B1 | * | 9/2006 | Paramore et al. .......... | 342/26 B |

* cited by examiner

*Primary Examiner*—John B Sotomayor
(74) *Attorney, Agent, or Firm*—Nathan O. Jensen; Kyle Eppele

(57) ABSTRACT

A weather radar detects and removes spurious aircraft from a weather radar display by using one of the methods of differentiating radar return length, estimating a vertical gradient of reflectivity, tracking radar returns into regions that are eliminated from the weather display to provide differentiation, tracking areas of radar returns that allow detection and removal of the spurious aircraft in relative geometries, differentiating Doppler velocity, and differentiating spectral width. The methods may be used individually or in combination to improve performance.

25 Claims, 10 Drawing Sheets

REMOVAL OF SPURIOUS AIRCRAFT DETECTIONS ON WEATHER RADAR

BACKGROUND OF THE INVENTION

This invention relates to weather radar, spurious aircraft detections, and specifically for removal of spurious aircraft detections from a weather radar display when displaying of such detections is not desired.

Weather radars are known in the art for detecting and displaying severe weather to a crew in an aircraft on a two-dimensional map display showing range, bearing, and intensity of a detected weather system, which may be convective or stratiform in nature. Flight hazards due to weather conditions are primarily the result of precipitation and turbulence. Airborne weather radars have been optimized to detect rain.

As weather radars become more sensitive and hold and process previously sampled state information, other aircraft are being detected and displayed to flight crews when not desired. Newer radars use longer transmitter pulse widths that make the problem worse since the length of the radar return from aircraft on the radar display is not substantially different from the radar return length as produced by a small area weather feature.

A spurious aircraft may appear as multiple images on a weather radar system display due to storage of the target echo in internal memory and the motion of the spurious aircraft. Having a weather display with spurious aircraft displayed is undesirable since it may lead to difficult decision making about the weather and the spurious aircraft motion.

What is needed is a reliable low-cost system for detection and removal of spurious aircraft from a weather radar display.

SUMMARY OF THE INVENTION

A weather radar system for detecting and removing spurious aircraft from a weather radar display is disclosed. The weather radar system has a transmitter for transmitting pulses and a receiver for receiving return pulses from a weather system and the spurious aircraft. A processor connected to the transmitter and receiver generates the transmitted pulses, processes the return pulses from the weather system and the spurious aircraft, and determines a presence of the spurious aircraft. The weather radar display is connected to the processor to display the weather system with the spurious aircraft removed by the processor.

The weather radar system detects the spurious aircraft by using at least one of the characteristics of the spurious aircraft such as differentiating radar return length, estimating a vertical gradient of reflectivity, tracking radar returns into regions that are eliminated from the weather display to provide differentiation, tracking areas of radar returns that allow detection and removal of the spurious aircraft in relative geometries, differentiating Doppler velocity, and differentiating spectral width.

The weather radar system detects and removes spurious aircraft from the weather radar display by differentiating radar return length by transmitting high resolution pulses that detect the spurious aircraft and the weather system. The receiver receives high resolution pulse returns from the spurious aircraft and high resolution pulse returns from the weather system. The processor generates the high resolution pulses, processes the high resolution pulse returns from the spurious aircraft, the high resolution pulse returns from the weather system, and identifies the spurious aircraft from the high resolution pulse returns from the spurious aircraft and the high resolution pulse returns from the weather system. The processor compares the high resolution pulse returns from the spurious aircraft and the high resolution pulse returns from the weather system to a model, determines that the high resolution pulse returns are from the spurious aircraft when they are short length and the high resolution pulse returns from the weather system are long length, and edits a range at which the spurious aircraft is identified to remove the spurious aircraft from the display.

The weather radar system detects and removes spurious aircraft from the weather radar display by estimating vertical gradients of reflectivity. An antenna connected to the receiver and transmitter scans a radar beam vertically or horizontally to receive return pulses from the weather system and the spurious aircraft. The processor determines from the return pulses a vertical gradient of reflectivity for the weather system and a vertical gradient of reflectivity for the spurious aircraft, compares the vertical gradient of reflectivity of the spurious aircraft and the weather system, edits out returns from the spurious aircraft when the vertical gradient of reflectivity of the spurious aircraft is of limited extent and increases as altitude increases compared to the vertical gradient of reflectivity of the weather system, and removes the spurious aircraft from the weather display.

The weather radar system detects and removes spurious aircraft from the weather radar display by tracking radar returns into regions eliminated from the weather display to provide differentiation. An antenna connected to the receiver and transmitter points a first radar beam to receive return pulses from the weather system and receives return pulses in the first radar beam field of view. The processor determines if the return pulses in the first radar beam field of view are from the spurious aircraft return compared to the return pulses from the weather system. The processor identifies the return pulses as being from the spurious aircraft and accumulates tracking data of the spurious aircraft. The antenna receives return pulses with a second radar beam from the spurious aircraft as the spurious aircraft passes into a field of view of the second radar beam and is no longer identified as the spurious aircraft by the vertical gradient return by the processor. The processor continues identification of the spurious aircraft with the second radar beam based on the tracking data and removes the spurious aircraft from the weather radar display.

The weather radar system detects and removes spurious aircraft from the weather radar display by tracking areas of radar returns that allow detection and removal of the spurious aircraft based on relative geometries. An antenna connected to the receiver and transmitter tracks the spurious aircraft across a weather radar field of view. The processor compares return pulses from the spurious aircraft and the weather system, determines that the return pulses from the spurious aircraft are not weather like due to motion and position of the spurious aircraft, and removes the spurious aircraft from the weather radar display.

The weather radar system detects and removes spurious aircraft from the weather radar display by differentiating Doppler velocity with a Doppler process. The processor identifies return pulses as coming from the spurious aircraft when the Doppler process shows that a mean velocity is substantially different than an expected mean velocity from the weather system in an environment flow in a sampled radar volume, and removes the spurious aircraft from the radar display.

The weather radar system detects and removes spurious aircraft from the weather radar display by differentiating spectral width. The processor identifies return pulses as coming from the spurious aircraft when a narrow spectral width of return pulses is received from the spurious aircraft compared to a wide spectral width of return pulses from the weather system. The processor identifies the narrow spectral width as coming from the spurious aircraft, and removes the spurious aircraft from the weather radar display.

It is an object of the present invention to provide a weather radar system that identifies and removes spurious aircraft from a weather radar display.

It is an object of the present invention to provide a capability to detect and remove spurious aircraft that can be incorporated into an existing weather radar system.

It is an advantage of the present invention to provide a weather radar system to detect and remove spurious aircraft with several embodiments disclosed that can be used individually or in combination to improve performance.

It is an advantage of the present invention to provide a weather display with the spurious aircraft images removed to avoid pilot confusion and errors.

It is a feature of the present invention to provide reliable removal of spurious aircraft from a weather radar display.

It is a feature of the present invention to provide low cost methods of removal of spurious aircraft from a weather radar display.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for a system and method to detect and remove spurious aircraft from a weather radar display that can be incorporated into an existing weather radar system. Several embodiments of the invention are disclosed that can be used individually or in combination to improve performance.

Figure 1:
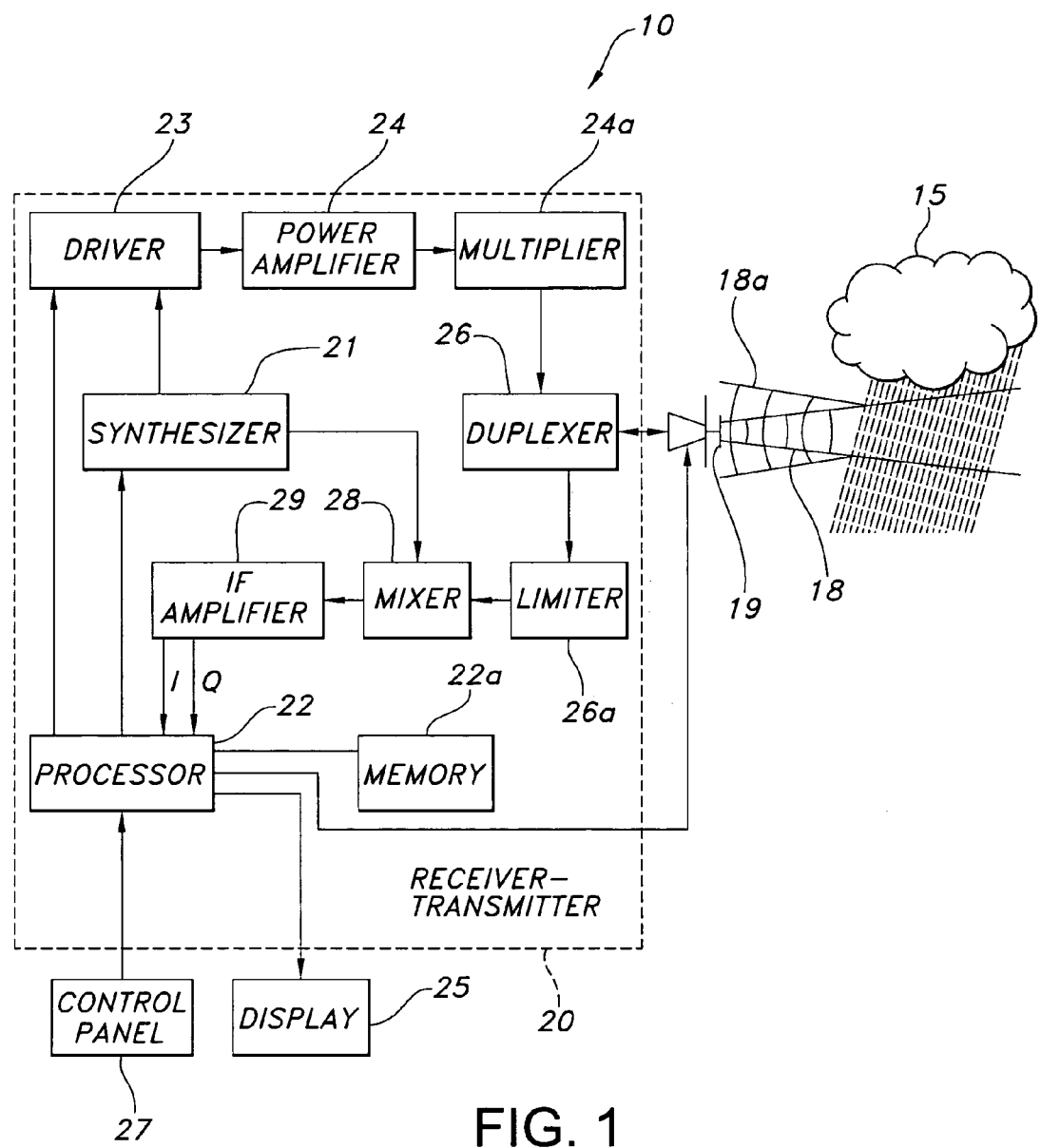
FIG. 1 is a block diagram of an exemplary weather radar system that may incorporate the present invention.

Weather radars are known in the art for detecting severe weather and for providing a flight crew in an aircraft a two-dimensional map display showing range, bearing, and intensity of detected weather systems. Flight hazards due to weather conditions are primarily the result of precipitation and turbulence. A block diagram of a representative weather radar 10 that may incorporate the present invention for removal of spurious aircraft detections is shown in FIG. 1. The weather radar 10 may be a WXR-2100 MULTISCAN Weather Radar System manufactured by Rockwell Collins Inc. and used herein as an exemplary weather radar system in which to incorporate the present invention.

In FIG. 1 pulses 18 are transmitted from the weather radar system 10 using antenna 19 and reflected from a target 15 as return pulses 18a that are received by the antenna 19. Within a receiver-transmitter 20 the transmitted pulses 18 are generated using a reference signal from a synthesizer 21. The width and pulse repetition frequency (PRF) of the pulses 18 are generated in a driver 23 and controlled by a processor 22. The pulses 18 are amplified in power amplifier 24 and multiplied to a final transmit frequency in multiplier 24a. A duplexer 26 directs the multiplier 24a output to the antenna 19.

The return pulses 18a from the target 15 are passed through the duplexer 26 to a limiter 26a where strong return pulses 18a are attenuated. The output of the limiter 26a is connected to a mixer 28 where the return pulses 18a are down converted in frequency by mixing with an oscillator signal from the synthesizer 21 to produce an intermediate frequency (IF) return signal that is amplified by an IF amplifier 29.

The IF return signal is converted into in-phase (I) and quadrature (Q) components and digitized in the IF amplifier 29. The digitized return signals are then processed by the processor 22. The processor 22 uses a series of algorithms to determine the magnitude, spectral width, and velocity gradients of each return pulse 18a.

The results of the processed returns are then encoded to a serial data word that is sent to a system display 25. Encoded in the serial data word is the reflectivity data and message information to be displayed to the flight crew. The colors on the display 25 indicate the reflectivity with black representing zero to minimal reflectivity, green representing light reflectivity, yellow indicating moderate reflectivity, red representing heavy to extreme reflectivity, and magenta indicating turbulence.

A weather radar system control panel 27 provides control signals to the weather radar system receiver-transmitter 20. Depending upon the weather radar system configuration, the control panel 27 provides operating mode selection, ground clutter suppression selection, system select, antenna tilt control in manual mode, and system gain control.

The amount of energy returned in the return pulses 18a depends on the reflective quality of the target 15. When short pulses strike a target 15 such as precipitation, some of the energy is absorbed, some of it is refracted, and the remainder is reflected. Heavy rainfall produces the strongest reflections; light rainfall, snow, and ice crystal produce weak returns.

The strength of the return pulses 18a is also related to the distance the pulses must travel. Radar systems compensate for the attenuation of the signal due to the distance traveled with a sensitivity time control (STC) function (not shown). The STC function controls receiver sensitivity with respect to time and thus range. The receiver sensitivity increases during the period between transmitted pulses when the receiver is listening for return pulses.

The return pulses 18a provide strength information and range to the target 15 such as a thunderstorm in FIG. 1. The range of the target 15 is determined by the amount of elapsed time that occurs between the transmission of a pulse 18 and the reception of the reflected or return pulse 18a. The direction or azimuth bearing of the target 15 is determined by noting the azimuth pointing position of the antenna 19. Bearing and range information is then coupled with the reflectivity information and applied to the display 25.

The exemplary WXR-2100 MULTISCAN Weather Radar System is capable of operating in an automatic multiscan mode with processor 22 controlling the weather radar system gain and antenna 19 tilt functions over multiple tilt settings and storing the individual scan data in a memory 22a of the system receiver-transmitter 20. This scan data is continually refreshed and corrected in the memory 22a for aircraft motion by processor 22. The data sent to the system display 25 is a composite of multiple scans that have been processed to remove ground clutter and refine the image. This operation optimizes the display images shown to the flight crew by showing short, mid, and long range weather targets.

In the exemplary weather radar system 10, the total time required to complete one cycle of multiple tilt scans in any of the weather detection modes except windshear is eight seconds. In the windshear mode a complete cycle requires 11.2 seconds. To compensate for aircraft movement during the multiple scans the digital image is translated and rotated in the memory 22a under processor 22 control. This weather radar operation is described in U.S. Pat. No. 6,424,288 "Multi-Sweep Method and System for Detecting and Displaying Weather Information on a Weather Radar System" by Daniel L. Woodell and U.S. Pat. No. 6,603,425 "Method and System for Suppressing Ground Clutter Returns on an Airborne Weather Radar" by Daniel L. Woodell, both patents assigned to the assignee of the present invention, and incorporated herein by reference.

Figure 2:
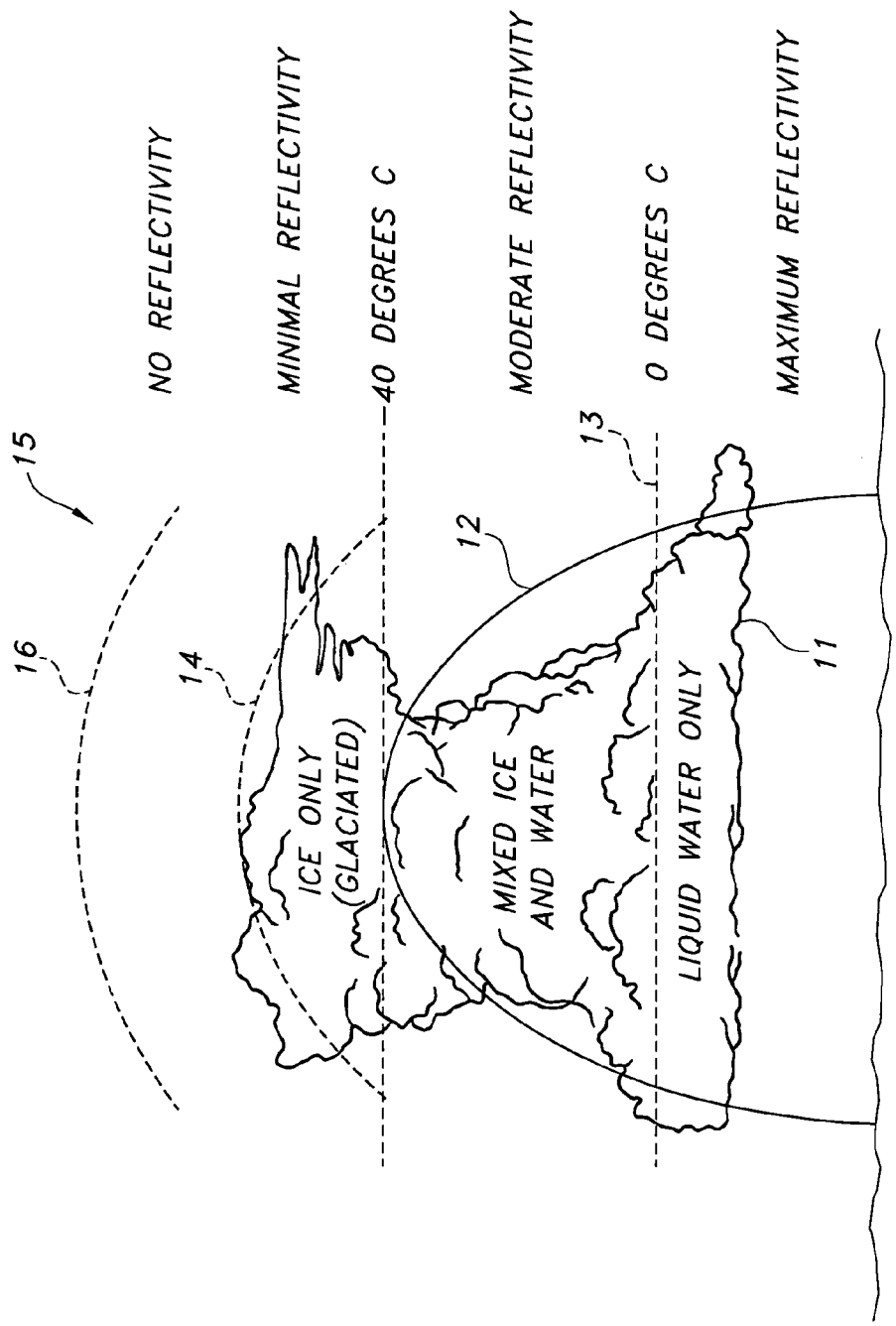
FIG. 2 is a diagram illustrating the geometric distribution of typical thunderstorm.

To understand multiscan operation, it is necessary to understand a typical thunderstorm. FIG. 2 is a diagram illustrating the geometric distribution of typical thunderstorm 15. A portion 11 of thunderstorm 15 at the lowest altitude contains liquid water only. This wet portion 11 has a high level of radar reflectivity. Above a freezing level 13, thunderstorm 15 includes a mixture of ice and water, with moderate radar reflectivity, and a portion of thunderstorm 15 above a temperature level of about 40 degrees C. contains ice only, with relatively low radar reflectivity. Above the ice portion of thunderstorm 15, there is a region 16 with little or no radar reflectivity, where turbulence may exist due to a building thunderstorm 15.

Based on the geometry of thunderstorm 15, regions may be defined by their ability to be detected by radar, their visibility, and their effect on an aircraft. Region 12, which includes the liquid water and the mixed ice and water portions of thunderstorm 15, is a region that is detectable by the aircraft weather radar system 10, due to the high and moderate radar reflectivity of those portions of the thunderstorm 15. Region 14, which includes the ice portion of thunderstorm 15, is a region that is visible to a pilot but is not normally detectable by radar, due to the low radar reflectivity of the ice portion of thunderstorm 15. Region 16 is not visible or detectable by radar, but is a region of possible high turbulence that can affect the stability of an aircraft passing through.

Since most weather threats are associated with convective weather such as thunderstorm 15, the detection of convective weather should be optimized throughout such weather's maturity cycle. Optimal convective weather detection samples the region of space at or near the freezing altitude 13 in the atmosphere since detectable reflectivity begins at this altitude and reflectivity is strongest at this altitude for most of a convective weather cell's life cycle.

Figure 3:
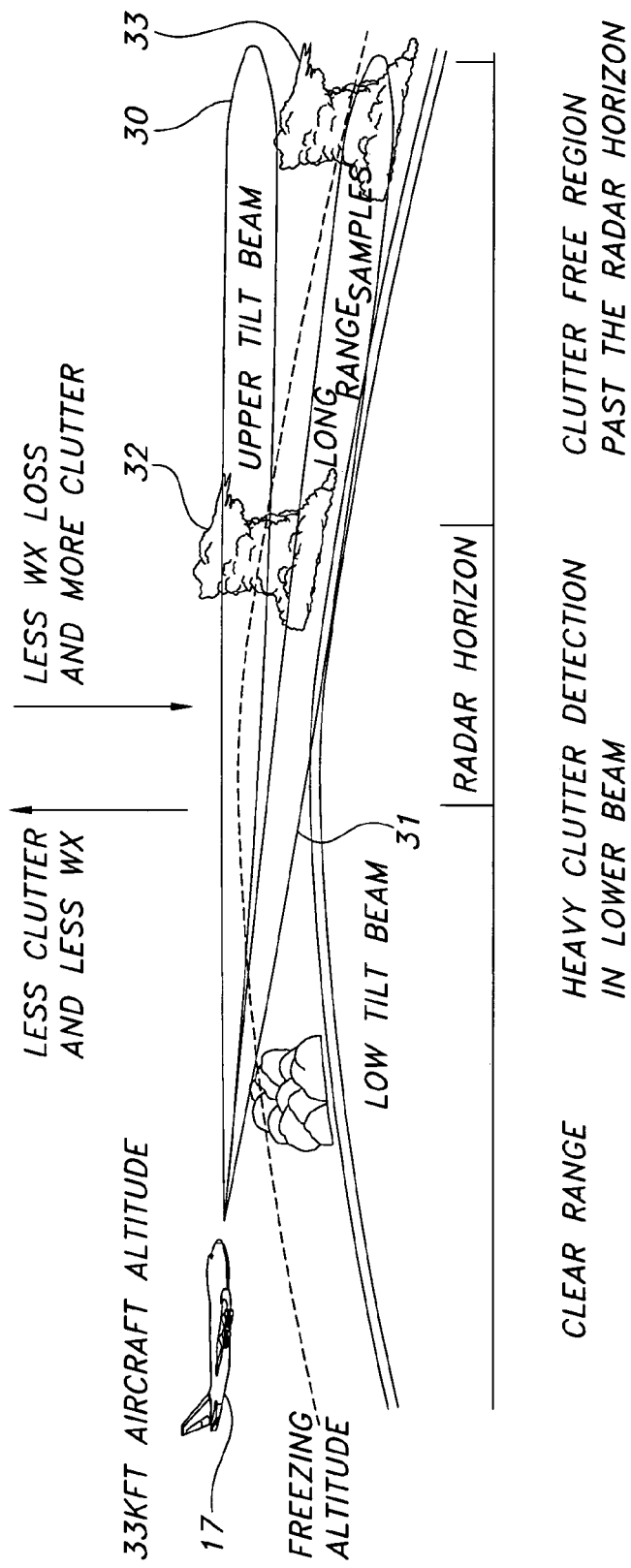
FIG. 3 illustrates multiscan operation of the weather radar system of FIG. 1.

FIG. 3 shows an aircraft 17 flying at 33,000 feet using an upper tilt beam 30 and lower tilt beam 31 to illuminate weather (precipitation) targets 32 and 33. During multiscan operation the receiver-transmitter 20 transmits, during a clockwise sweep, a non-windshear pulse pattern at the upper tilt angle. The next sweep the receiver-transmitter 20 transmits the non-windshear pulse pattern at the lower tilt angle. The tilt angles used during multiscan operation are dependent upon aircraft 17 barometric altitude and the terrain height. Reflectivity data is gathered from both tilt scans at four different frequencies using two different pulse widths. The data is placed into memory 22a in memory planes with each scan generating a short pulse memory plane (0 to 44 nm) and a long pulse memory plane (0 to 331 nm). For the upper tilt beam 30 and lower tilt beam 31, four memory planes are generated.

The processor 22 performs several algorithms that identify ground clutter within the reflectivity using scan-to-scan correlation and beam-to-beam correlation. The data stored in the memory planes is used to support all selected ranges, modes of operation, and selected display options. Transmit pulse widths of 6 and 25 microseconds build 512 sample bins for long range data and 256 sample bins for short range data in the multiscan system.

The memory 22a is geographically aligned in memory planes. The data in each plane is located so that the target data can be correlated between each of the memory planes. The data stored is averaged and filtered with each subsequent scan. The data is continually refreshed and corrected for aircraft motion. All significant weather data is available in the memory planes.

When the data is processed for display, the data from the short range pulses and long range pulses from both the upper and lower tilt scans is merged, ground clutter eliminated, the flight crew commanded display options are processed and the weather optimized display data is sent to the display 25. The data sent to the display 25 is generated from the four memory planes and not directly related to the antenna scan. The data sampling process has been decoupled from the display 25 process to provide the multiple beam advantage of a merged, optimized display of weather targets from 0 to 320 nm.

Multiscan is designed for fully automatic operation. For automatic operation the flight crew selects the automatic function, a display mode WX (weather), WX+T (weather plus turbulence), or TURB (turbulence), and a desired range. Once in automatic multiscan mode the processor 22 adjusts antenna 19 tilt and receiver gain to provide an optimum weather display for any range scale. In the WX+T and TURB modes, turbulence is displayed out to 40 nm for all selected ranges. Because multiscan operation uses multiple scans to detect all significant weather targets, the entire weather picture from 0 to 320 nm is stored in memory 22a. This includes turbulence data and precipitation velocity variances.

Turbulent areas within a precipitation weather target 15 can be identified by Doppler processing of transmit and receive signals in the weather radar system 10. A turbulent target is a target that exhibits a wide variance in particle velocities. The velocity variance of droplets can be thought of as a spectrum of velocities. The broader the spectrum, the greater the turbulence present in the weather target. To provide an accurate spectrum of return signal frequencies, a large number of samples (returns) must be used to produce accurate and reliable results. The threshold of turbulent targets in precipitation exceeds a velocity width of 5 meters/second. This threshold translates into a Doppler frequency shift of 312.5 Hz. For this reason, PRF in the turbulence mode of operation is increased to 1838 pulses/second. With this large number of transmit pulses 18, the receiver-transmitter 20 processes every pulse for precipitation information and provides turbulence data from the spectrum of Doppler shifts caused by precipitation movement. Because of the high PRF rate, the maximum range for turbulence detection is approximately 44 miles.

Once an accurate spectrum of return signals is obtained, turbulence processor circuits determine if the spectrum represents a spectrum of a turbulent target. The alert threshold for passenger carrying air transport aircraft is approximately 5 to 7.5 meters-per-second. The five meter-per-second threshold corresponds to the threshold between light and moderate turbulence that can cause food and beverage spillage or possible minor injury.

The frequency of the return signal is offset from the transmitted frequency because of the Doppler shift caused by the velocity of the aircraft 17 with respect to the target 15. In addition to the frequency shift caused by the aircraft velocity, a frequency shift is caused by the movement of the precipitation. To measure the spectrum width of the frequency shifts caused by precipitation movement, the Doppler shift due to the aircraft must be filtered out.

The pulse width transmitted is selected based upon the selected range and mode of operation. By using multiple pulse widths, the receiver-transmitter 20 can optimize the operation of the system for a particular range and operation mode. This optimization provides a better resolution in the weather display and efficient use of the transmitted energy. Another factor selected in the receiver-transmitter 20 to optimize performance is the pulse repetition frequency (PRF). PRF optimization is possible with separating detection from assessment. At shorter selected ranges, the receiver portion of the receiver-transmitter 20 is not required to listen for relatively long periods of time. The transmitter is then free to increase the number of transmitted pulses 18. The greater number of transmitted pulses 18 provides more information and a faster update of weather targets present. The PRF may be optimized for detection of a weather system and then changed to a PRF optimized for assessment.

Figure 4:
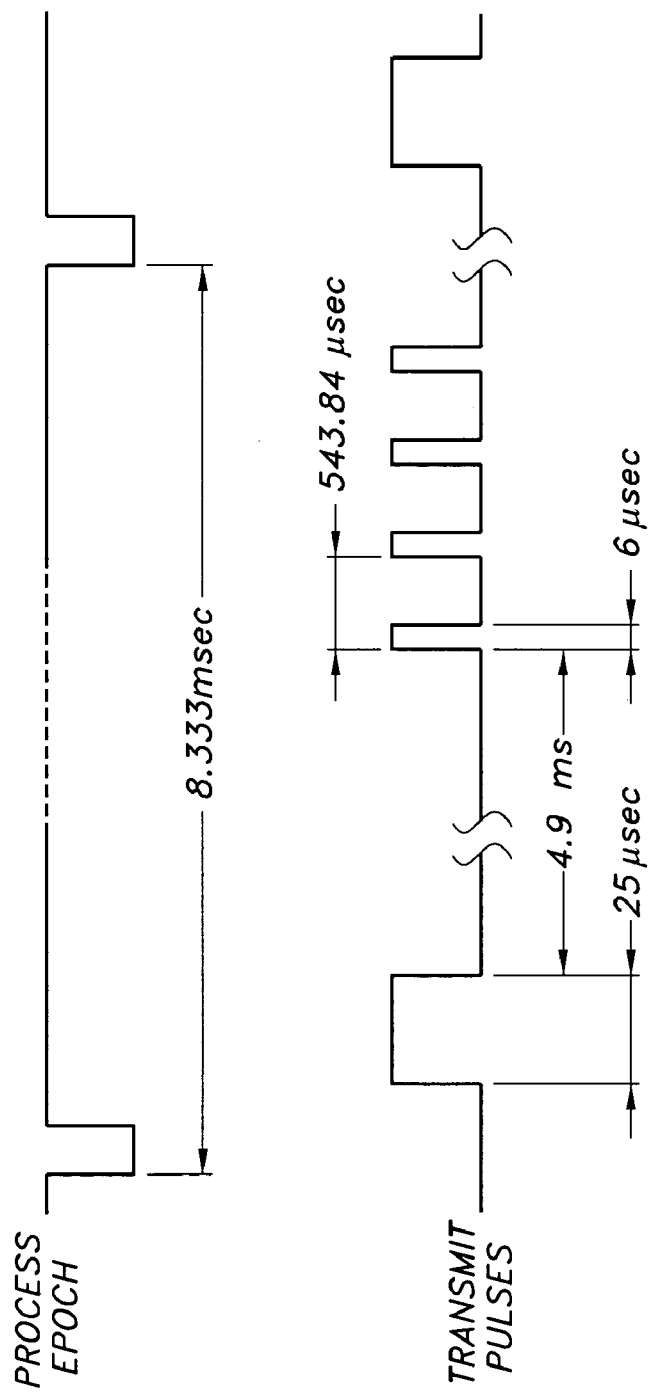
FIG. 4 shows a typical pattern of transmitted pulses for non-windshear operation in the weather radar system of FIG. 1 for a reflectivity mode.

A typical pattern of transmitted pulses 18 for non-windshear operation in the weather radar system 10 is shown in FIG. 4 for the weather mode. For any selected range one 25-microsecond pulse and four 6-microsecond pulses are transmitted during each process epoch of 8.333 milliseconds in this example. After transmitting the 25-microsecond pulse there is a 4.9-millisecond space. This allows returns from targets as far away as 331 nautical miles. Other pulse patterns (not shown) are possible such as a compressed long pulse with high range resolution with or without the simple short pulses. Compressed long pulses use pulse compression techniques known in the art and have range resolution similar to short pulses. A process epoch is the time interval in which a radial of radar data is processed. This time is equal to the size of the radar processing element in degrees divided by the antenna 19 scan rate. This pulse pattern is transmitted at each radial of the antenna 19 scan. The transmitted frequency alternates between seven weather transmit channel frequencies. For example, the weather radar system 10 is operating in a weather detection mode and the antenna 19 is scanning clockwise. At the 0-degree radial the transmitter transmits the pulse pattern of FIG. 4 on a first transmit channel frequency of seven frequencies. At the completion of that epoch the antenna 19 moves a three eights-degree clockwise and the pulse pattern is transmitted again at one of six remaining frequencies. At the next three eights-degree radial of the antenna 19, the transmit pulse pattern is repeated at one of the remaining six transmit frequencies. The pulse pattern and seven frequencies are used for all non-windshear modes of operation such as weather, turbulence, weather plus turbulence, and ground mapping detection.

The present invention is for a system and method that can be incorporated into the weather radar system 10 of FIG. 1 to detect and remove other aircraft from the weather radar display 25. Several embodiments of the invention are disclosed that include differentiating radar return length, estimating vertical gradients of reflectivity, tracking radar returns into regions that are eliminated from the weather display to provide differentiation, tracking areas of radar returns that allow detection and removal of the spurious aircraft based on relative geometries, differentiating Doppler velocity, and differentiating spectral width. These embodiments may be used individually or in any combination to detect and remove spurious aircraft. Using these embodiments in combination improves the reliability of detection of a spurious aircraft.

Figure 5:
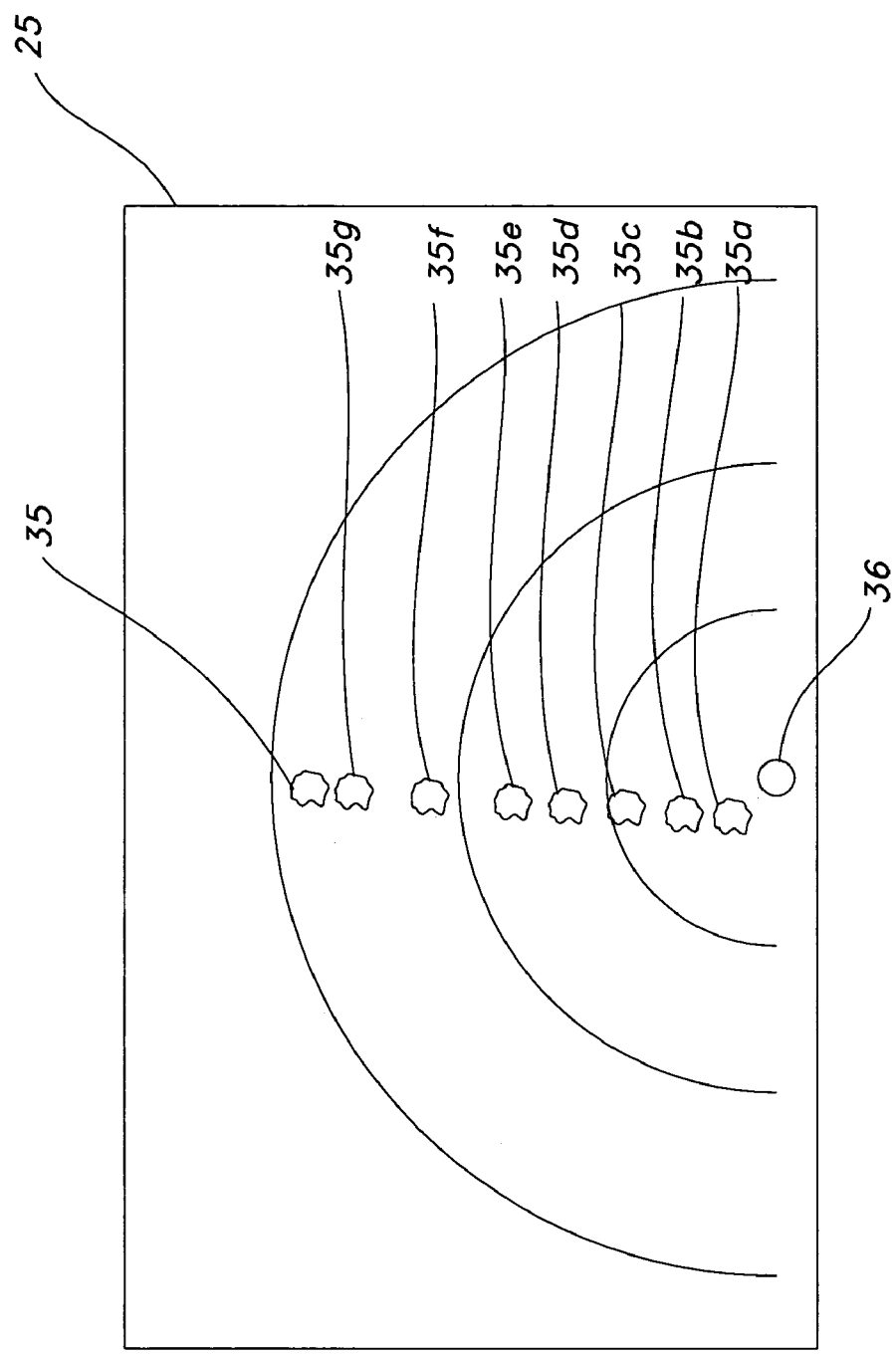
FIG. 5 shows a weather radar display with a spurious aircraft image.

The weather radar display 25 with a spurious aircraft 35 image is shown in FIG. 5. An aircraft with the weather radar system 10 is located at aircraft position 36. The spurious aircraft 35 appears in multiple positions on the display 25 because of the multiscan operation of the weather radar system 10 and the motion of the spurious aircraft 35. The spurious aircraft 35 is located at some distance in front of and is moving in the same direction as the aircraft 36 with the radar system 10 on board. The first spurious aircraft image 35*a* is generated and displayed from an earlier return when the radar equipped aircraft 36 was further away from the present shown position. The spurious aircraft image 35*a* was made from returns received, stored, and translated due to aircraft 36 motion. The next spurious aircraft image 35*b* was generated from returns from spurious aircraft 35 at a short time later that were stored and translated. The other images 35*c*, 35*d*, 35*e*, 35*f*, and 35*g* were generated in a similar manner. The final spurious aircraft image 35 is the current position of the spurious aircraft 35.

Figure 6:
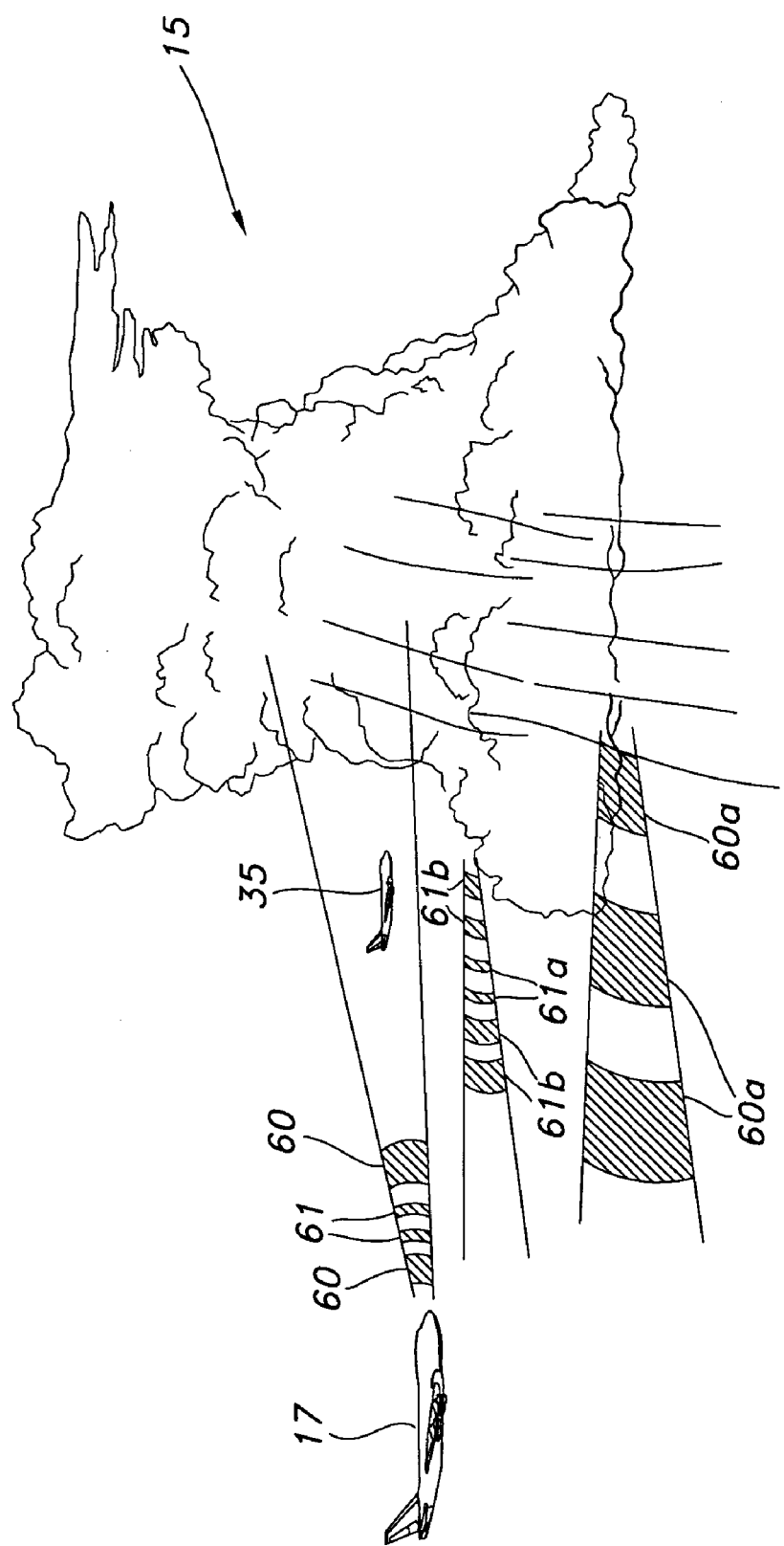
FIG. 6 shows a first embodiment of the present invention where radar return length differentiation is used to separate and edit out shorter spurious aircraft returns from longer length weather returns in the weather radar system of FIG. 1.

In a first embodiment of the present invention shown in FIG. 6, radar return length differentiation is used to separate and edit out shorter returns from the spurious aircraft 35 from longer length weather returns in the weather radar system 10 of FIG. 1. The weather radar system 10 of FIG. 1 may intermix high resolution pulses 61, such as short pulses or compressed long pulses, and long pulses 60 as shown in FIG. 6 while scanning a weather system such as thunderstorm 15. The weather radar system 10 may transmit just the high resolution pulses 61. The receiver-transmitter 20 transmits the high resolution pulses 61 that result in high resolution return pulses 61*a* from the spurious aircraft 35 and high resolution return pulses 61*b* from the thunderstorm 15. High resolution return pulses 61*a* from high resolution pulses 61 may not be used for radar display because of low loop gain due to bandwidth but may still be used to identify spurious aircraft 35. The high resolution return pulses 61*a* from the spurious aircraft 35 are shorter than the high resolution return pulses 61*b* from the thunderstorm 15 since the weather system is much larger than the spurious aircraft 35. The transmitted long pulse 60 may not result in a return from the spurious aircraft 35 at close range since the long pulse 60 is still being sent when a return from the long pulse 60*a* is ready to be received but cannot since the radar is still transmitting. The processor 22 compares the high resolution return pulses 61*a* from the spurious aircraft 35 to model for point targets and longer high resolution return pulses 61*b* from the weather system 15 to a model for volume targets and determines that the high resolution return pulses 61*a* are from the spurious aircraft 35. The spurious aircraft 35 is a point target that produces short length returns. The weather system 15 is a volume target that produces longer length returns. The range at which the processor 22 in FIG. 1 identifies the spurious aircraft 35 using the high resolution pulses 61 can be edited from the higher loop gain long pulse returns 60*a* to remove the spurious aircraft 35 from the display 25.

Figure 7:
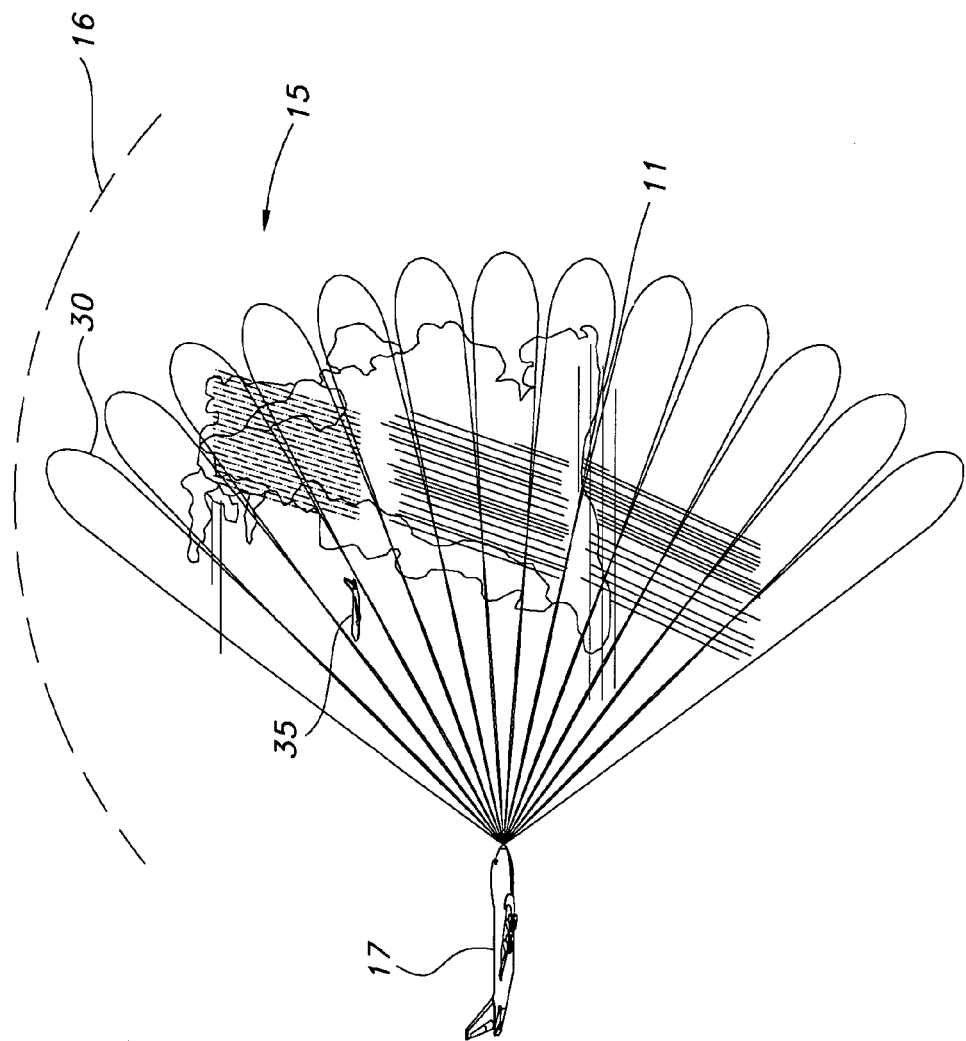
FIG. 7 shows a second embodiment of the present invention where an estimate of vertical gradients of reflectivity is made to separate and edit out returns from a spurious aircraft and a weather system.

In a second embodiment of the present invention an estimate of gradients of reflectivity is made to separate and edit out returns from the spurious aircraft 35 at short ranges. At longer ranges, needed signal-to-noise ratio is not available to make gradient based decisions. FIG. 7 shows vertical scanning to estimate a vertical gradient. The weather radar system 10 may use the multiscan multiple beam system as described above or a single tilted antenna beam that is swept through space as the aircraft 17 moves producing three dimensional representations of radar reflectivity. Most weather systems 15 produce negative reflectivity gradients as altitude increases, as shown in FIG. 2. Maximum reflectivity occurs in region 11 and decreases with increasing altitude to no reflectivity in region 16 for thunderstorm 15. Exceptions to this negative reflectivity gradient include vaulted weather systems when reflectivity is highest aloft. These weather systems tend to be of substantial extent that can be estimated by the radar returns range extent of the first embodiment.

In FIG. 7 a radar beam 30 from antenna 19 is scanned in altitude vertically to receive return pulses to determine the vertical gradients of reflectivity of the spurious aircraft 35 and the weather system 15. The beam 30 may also be scanned horizontally while being incremented vertically under control of the processor 22 to receive return pulses to determine the vertical gradients from multiple overlapping horizontal sweeps at various antenna tilt angles. The processor 22 then compares the vertical gradients of reflectivity and edits out returns from the spurious aircraft 35 when the spurious aircraft vertical gradient is of limited extent and remains constant compared to the vertical gradient of reflectivity of the weather system 15 as scan altitudes increase. The weather system 15 may also produce a negative vertical gradient of reflectivity as determined by the processor 22. The processor 22 then removes the spurious aircraft 35 from the weather display 25. This vertical gradient process may also be accomplished by using reflectivity data obtained from multiple horizontal and vertical antenna sweeps that are stored in memory 22*a* (see FIG. 1). The memory 22*a* may be organized in any of three ways, a horizontal sweep memory, a vertical sweep memory, or a three dimensional memory.

Spurious aircraft 35 may also be detected by an estimate of horizontal gradients of reflectivity to separate and edit out returns from the spurious aircraft 35 and the weather system 15 in a fashion similar to the vertical gradient process described above. In this case a horizontal scan of the antenna 19 produces a horizontal gradient of limited extent for the spurious aircraft 35 when compared to the horizontal gradient of the weather system 15.

In a third embodiment of the present invention, areas of radar returns from the spurious aircraft 35 that are eliminated from the weather display 25 by using any of the other methods described herein can be tracked into regions where neither the original nor other methods provide detection. The spurious aircraft 35 can continue to be removed by tracking the spurious aircraft 35 into regions where it cannot be detected. As an example in FIG. 8, the antenna 19 on an aircraft 17 points the upper radar beam 30 down to receive return pulses from the weather system 15 and also receives return pulses in the upper radar beam 30 field of view. The processor 22 determines if the return pulses in the upper radar beam 30 field of view are from the spurious aircraft 35 by the size and extent of a vertical gradient return compared to the pulse returns from the weather system 15. The processor 22 identifies the pulses returns as being from the spurious aircraft 35 and accumulates tracking data of the spurious aircraft 35. The antenna 19 receives pulse returns with a lower radar beam 31 at a different tilt angle than the upper radar beam 30 from the spurious aircraft 35 as the spurious aircraft 35 passes into a field of view of the lower beam 31 and is no longer identified as the spurious aircraft 35 by the vertical gradient return by the processor 22. If good track logic data has been accumulated by the weather radar system 10, the spurious aircraft 35 can continue to be identified by the processor 22 when the spurious aircraft 35 is illuminated with the lower beam 31 and removed from the weather radar display 25 by the processor 22.

Figure 8:
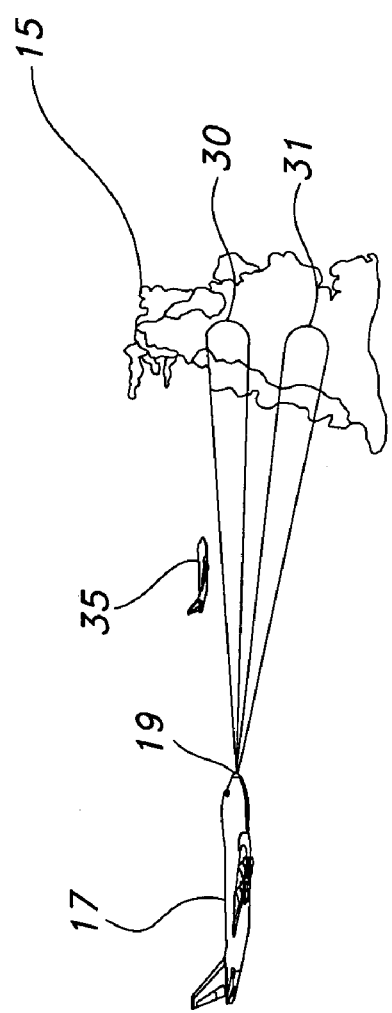
FIG. 8 illustrates a third embodiment of the present invention where areas of radar returns that have previously been eliminated from a weather display can be tracked into regions where neither the original nor other methods provide differentiation.

FIG. 8 shows an example of the third embodiment and other configurations are possible. For example, an aircraft may be located in the lower beam 31 field of view and may be identified as the spurious aircraft 35. The spurious aircraft 35 can then move out of the lower beam 31 into the upper beam 30 field of view where it is tracked using track logic data accumulated by the weather radar system 10. The spurious aircraft 35 can continue to be identified by the processor 22 when in the upper beam 30 and can be removed from the weather radar display 25 by the processor 22.

Figure 9:
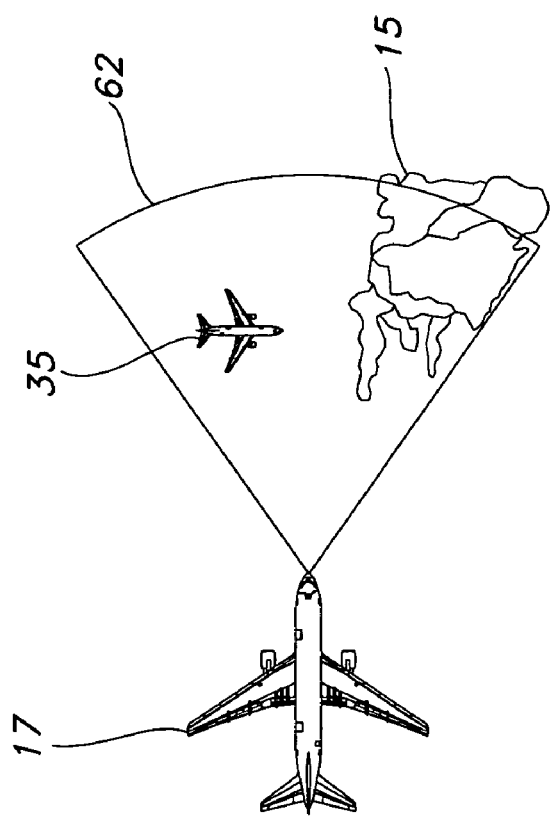
FIG. 9 illustrates a fourth embodiment of the present invention where tracking areas of radar pulse returns also allows detection and removal of a spurious aircraft in some relative geometries.

In a fourth embodiment of the present invention, radar returns from the spurious aircraft 35 are tracked that allow detection and removal of the spurious aircraft 35 in certain relative geometries created by the motion and position of the spurious aircraft 35 relative to the weather system 15. In FIG. 9 consider the spurious aircraft 35 moving across the weather radar system 10 field of view 62 in front of the weather system 15. Since both the radar equipped aircraft 17 and the spurious aircraft 35 are in an environmental airflow, the tracked movement of the spurious aircraft 35 across the radar's field of view 62 produces return pulses that are not like return pulses from weather system 15. The relative geometries that allow detection include motion of the spurious aircraft 35 across the radar's field of view with horizontal, climbing or descending aircraft motion. Motion of the spurious aircraft 35 produces returns that are different than the returns from the weather system 15 thereby allowing identification of the spurious aircraft 35 and removal from the display 25 by the processor 22.

Figure 10:
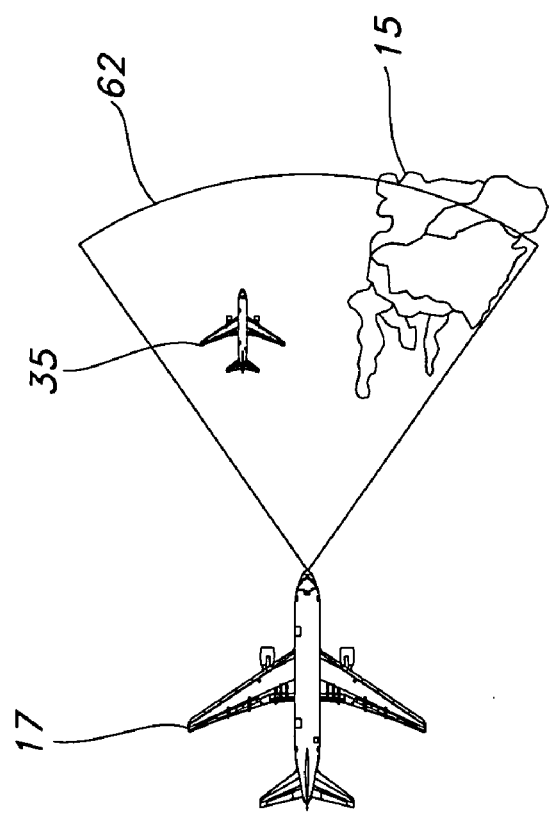
FIG. 10 shows a fifth embodiment of the present invention where Doppler methods are used to remove a spurious aircraft from a weather radar display by Doppler velocity differentiation.

In a fifth embodiment of the present invention shown in FIG. 10, Doppler methods are used to remove the spurious aircraft 35 from the weather radar display 25 by Doppler velocity differentiation. If the mean radial velocity estimated by the Doppler process for the spurious aircraft 35 is substantially different from the expected environmental flow in the sampled radar field of view 62 or volume, the return may be identified as coming from the spurious aircraft 35. The weather system 15 in FIG. 10 has a smaller mean radial velocity than the spurious aircraft 35. The spurious aircraft 35 may then be removed from the display 25 by the processor 22.

In a sixth embodiment of the present invention, also shown in FIG. 6, Doppler methods are used to remove the spurious aircraft 35 from the weather radar display by Doppler spectral width differentiation. Spectral width differentiation may be used by the processor 22 to identify a narrow spectral width of returns coming from the spurious aircraft 35 verses a wider spectral width that results from the weather system 15.

Several embodiments for removing a spurious aircraft 35 from a weather radar display 25 are disclosed. These embodiments may be used individually or in combination to generate high confidence for removal of spurious aircraft 35 in a weather radar display 25.

A preferred embodiment for inclusion into the WXR-2100 Weather Radar System 10 is use of both the short range differentiation method of the first embodiment and the non-tracking vertical reflectivity gradient method of the second embodiment. The short range differentiation method of the first embodiment operates first and any spurious aircraft 35 not removed by this method are subjected to the vertical reflectivity gradient method of the second embodiment.

It is believed that the spurious aircraft detecting weather radar of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A weather radar system for detecting a weather system and a spurious aircraft and for removing the spurious aircraft from a weather radar display said weather radar system comprising:
   a transmitter for transmitting pulses;
   a receiver for receiving return pulses from the weather system and from the spurious aircraft;
   a processor connected to the transmitter and receiver and for generating the pulses, for processing the return pulses from the weather system and from the spurious aircraft, and for determining a presence of the spurious aircraft; and
   the weather radar display connected to the processor and to display the weather system with the spurious aircraft removed by the processor;
   wherein said weather radar system detects said spurious aircraft by using at least one of differentiating radar return length, estimating a vertical gradient of reflectivity, tracking radar returns into regions eliminated from the weather display, tracking radar returns that allow detection and removal of the spurious aircraft in certain relative geometries, differentiating Doppler velocity, and differentiating spectral width.

2. The weather radar system of claim 1 wherein said weather radar system differentiates radar return length and further comprises:
   the transmitter for transmitting high resolution pulses;
   the receiver for receiving high resolution pulse returns from the spurious aircraft and high resolution pulse returns from the weather system; and
   the processor for generating the high resolution pulses, for processing the high resolution pulse returns, and for identifying the spurious aircraft from the high resolution pulse returns.

3. The weather radar system of claim 2 wherein the processor further compares the high resolution pulse returns from the spurious aircraft and the high resolution pulse returns from the weather system to a model, determines that the spurious aircraft is present when the high resolution pulse returns from the spurious aircraft are short length and the high resolution pulse returns from the weather system are long length, and edits a range at which the spurious aircraft is identified to remove the spurious aircraft from the display.

4. The weather radar system of claim 1 wherein said weather radar estimates vertical gradients of reflectivity and further comprises:
   an antenna connected to the receiver and transmitter and for scanning a radar beam to receive return pulses from the weather system and the spurious aircraft; and
   the processor for determining from the return pulses a vertical gradient of reflectivity for the weather system and a vertical gradient of reflectivity for the spurious aircraft, for comparing the vertical gradients of reflectivity of the weather system and of the spurious aircraft, for determining that the spurious aircraft is present when the vertical gradient of reflectivity of the spurious aircraft is of limited extent and remains substantially constant compared to the vertical gradient of reflectivity of the weather system as scan altitudes increase, and for removing the spurious aircraft from the weather display.

5. The weather radar system of claim 1 wherein said weather radar system tracks radar returns into regions eliminated from the weather display and further comprises:
   an antenna connected to the receiver and transmitter and for receiving return pulses from the weather system and for receiving return pulses in a first radar beam field of view from the spurious aircraft;
   the processor for determining if the return pulses in the first radar beam field of view are from the spurious aircraft compared to the return pulses from the weather system and for accumulating tracking data of the spurious aircraft;
   the antenna for receiving return pulses with a second radar beam from the spurious aircraft as the spurious aircraft passes into a field of view of the second beam and is no longer identified as the spurious aircraft by the vertical gradient return by the processor; and
   the processor for continuing identification of the spurious aircraft with the second radar beam based on the spurious aircraft tracking data and for removing the spurious aircraft from the weather radar display.

6. The weather radar system of claim 1 wherein said weather radar system tracks radar returns that allow detection and removal of the spurious aircraft in certain relative geometries and further comprises:
   an antenna connected to the receiver and transmitter and for tracking the spurious aircraft across a weather radar field of view; and
   the processor for comparing the return pulses from the spurious aircraft and from the weather system, for determining that the return pulses from the spurious aircraft are not weather like due to motion and position of the spurious aircraft relative to the weather system, and for identifying the spurious aircraft and removing the spurious aircraft from the weather radar display.

7. The weather radar system of claim 1 wherein said weather radar system differentiates Doppler velocity with a Doppler process and the processor further identifies the return pulses as coming from the spurious aircraft when the Doppler process shows that a mean velocity is substantially different than an expected mean velocity from the weather system, and removes the spurious aircraft from the weather radar display.

8. The weather radar system of claim 1 wherein said weather radar system differentiates spectral width and the processor further identifies the return pulses as coming from the spurious aircraft when a narrow spectral width of the return pulses is received from the spurious aircraft compared to a wide spectral width of the return pulses from the weather system and removes the spurious aircraft from the weather radar display.

9. A method of detecting and removing a spurious aircraft from a weather radar display in a weather radar system comprising the steps of:
- transmitting pulses from a transmitter to detect a weather system and the spurious aircraft;
- receiving with a receiver return pulses from the weather system and from the spurious aircraft;
- generating the pulses with a processor connected to the transmitter and the receiver;
- processing with the processor the return pulses from the weather system and from the spurious aircraft;
- determining a presence of the spurious aircraft; and
- displaying, with the weather radar display, the weather system with the spurious aircraft removed by the processor.

10. The method of detecting and removing the spurious aircraft on the weather radar display in the weather radar system of claim 9 further comprising the steps of:
- generating high resolution pulses with the processor;
- transmitting the high resolution pulses to detect the spurious aircraft and the weather system;
- receiving high resolution pulse returns from the spurious aircraft and high resolution pulse returns from the weather system;
- processing the high resolution pulse returns from the spurious aircraft and high resolution pulse returns from the weather system; and
- identifying the spurious aircraft from the high resolution pulse returns from the spurious aircraft and the high resolution pulse returns from the weather system.

11. The method of detecting and removing the spurious aircraft on the weather radar display in the weather radar system of claim 10 wherein the step of identifying the spurious aircraft further comprises the steps of:
- comparing the high resolution pulse returns from the spurious aircraft and the high resolution pulse returns from the weather system to a model;
- determining that the high resolution pulse returns are from the spurious aircraft when the high resolution pulse returns from the spurious aircraft are short length and the high resolution pulse returns from the weather system are long length; and
- editing a range at which the processor identifies the spurious aircraft to remove the spurious aircraft from the display.

12. The method of detecting and removing the spurious aircraft on the weather radar display in the weather radar system of claim 9 further comprising the steps of:
- scanning the weather system and the spurious aircraft with a radar beam;
- receiving return pulses from the weather system and the spurious aircraft;
- estimating a vertical gradient of reflectivity of the weather system and a vertical gradient of reflectivity of the spurious aircraft from the return pulses;
- comparing the vertical gradient of reflectivity of the weather system and the vertical gradient of reflectivity of the spurious aircraft;
- determining that the spurious aircraft is present when the vertical gradient of reflectivity of the spurious aircraft is of limited extent and remains substantially constant compared to the vertical gradient of reflectivity of the weather system as scan altitudes increase; and
- removing the spurious aircraft from the weather radar display.

13. The method of detecting and removing the spurious aircraft on the weather radar display in the weather radar system of claim 9 further comprising the steps of:
- pointing a first radar beam to receive return pulses from the weather system;
- receiving return pulses in the first radar beam field of view;
- determining if the return pulses in the first radar beam are from the spurious aircraft compared to the return pulses from the weather system;
- accumulating tracking data of the spurious aircraft;
- receiving, with a second radar beam, return pulses from the spurious aircraft as the spurious aircraft passes into a field of view of the second beam and is no longer identified as the spurious aircraft by the vertical gradient return;
- continuing identification of the spurious aircraft with the second radar beam based on the tracking data; and
- removing the spurious aircraft from the weather radar display.

14. The method of detecting and removing the spurious aircraft on the weather radar display in the weather radar system of claim 9 further comprising the steps of:
- tracking the spurious aircraft across a weather radar field of view with an antenna;
- comparing the return pulses from the spurious aircraft and the weather system;
- determining that the return pulses from the spurious aircraft are not weather like due to motion and position of the spurious aircraft; and
- removing the spurious aircraft from the weather radar display.

15. The method of detecting and removing the spurious aircraft on the weather radar display in the weather radar system of claim 9 further comprising the steps of:
- determining a velocity estimate of the spurious aircraft using a Doppler process on the return pulses;
- identifying the return pulses as coming from the spurious aircraft when the Doppler process shows that a mean velocity is substantially different than an expected mean velocity from the weather system; and
- removing the spurious aircraft from the weather radar display.

16. The method of detecting and removing the spurious aircraft on the weather radar display in the weather radar system of claim 9 further comprising the steps of:
- comparing a narrow spectral width of the return pulses from the spurious aircraft to wider spectral width return pulses from the weather system;
- identifying the narrow spectral width return pulses as coming from the spurious aircraft; and
- removing the spurious aircraft from the weather radar display.

17. A method of removing spurious aircraft from a weather radar display in a weather radar system comprising at least one of the steps of differentiating radar return length, estimating a vertical gradient of reflectivity, tracking radar returns into regions that are eliminated from the weather display, tracking radar returns that allow detection and removal of the spurious aircraft in certain relative geometries, differentiating Doppler velocity, and differentiating spectral width.

18. The method of removing spurious aircraft on the weather radar display of claim 17 wherein the step of differentiating radar return length further comprises the steps of:
- generating high resolution pulses;
- transmitting the high resolution pulses to detect the spurious aircraft and the weather system;

receiving high resolution pulse returns from the spurious aircraft and high resolution pulse returns from the weather system;

processing the high resolution pulse returns from the spurious aircraft and high resolution pulse returns from the weather system; and identifying the spurious aircraft from the high resolution pulse returns from the spurious aircraft and the high resolution pulse returns from the weather system.

19. The method of removing spurious aircraft on the weather radar display of claim 18 wherein the step of identifying the spurious aircraft further comprises the steps of:

comparing the high resolution pulse returns from the spurious aircraft and the high resolution pulse returns from the weather system to a model;

determining that the high resolution pulse returns are from the spurious aircraft when the high resolution pulse returns from the spurious aircraft are short length and the high resolution pulse returns from the weather system long length; and editing a range at which the spurious aircraft is identified to remove the spurious aircraft from the display.

20. The method of removing spurious aircraft on the weather radar display of claim 17 wherein the step of estimating a vertical gradient of reflectivity further comprises the steps of:

scanning the weather system and the spurious aircraft with a radar beam;

receiving return pulses from the weather system and the spurious aircraft;

estimating a vertical gradient of reflectivity of the weather system and a vertical gradient of reflectivity of the spurious aircraft from the return pulses;

comparing the vertical gradient of reflectivity of the weather system and the vertical gradient of reflectivity of the spurious aircraft;

determining that the spurious aircraft is present when the vertical gradient of reflectivity of the spurious aircraft is of limited extent and remains substantially constant compared to the vertical gradient of reflectivity of the weather system as scan altitudes increase; and removing the spurious aircraft from the weather radar display.

21. The method of removing spurious aircraft on the weather radar display of claim 17 wherein the step of tracking radar returns into regions that are eliminated from the weather display further comprises the steps of:

pointing a first radar beam to receive return pulses from the weather system;

receiving return pulses in the first radar beam field of view;

determining if the return pulses in the first radar beam are from the spurious aircraft compared to the return pulses from the weather system;

accumulating tracking data of the spurious aircraft;

receiving return pulses with a second radar beam from the spurious aircraft as the spurious aircraft passes into a field of view of the second radar beam and is no longer identified as the spurious aircraft by the vertical gradient return;

continuing identification of the spurious aircraft with the second beam based on the tracking data; and removing the spurious aircraft from the weather radar display.

22. The method of removing spurious aircraft on the weather radar display of claim 17 wherein the step of tracking radar returns that allow detection and removal of the spurious aircraft in certain relative geometries further comprises the steps of:

tracking the spurious aircraft across a weather radar field of view;

comparing return pulses from the spurious aircraft and the weather system;

determining that the return pulses from the spurious aircraft are not weather like due to motion and position of the spurious aircraft; and removing the spurious aircraft from the weather radar display.

23. The method of removing spurious aircraft on the weather radar display of claim 17 wherein the step of differentiating Doppler velocity further comprises the steps of:

determining a velocity estimate of the spurious aircraft using a Doppler process on the return pulses;

identifying the return pulses as coming from the spurious aircraft when the Doppler process shows that a mean velocity is substantially different than an expected mean velocity from the weather system; and removing the spurious aircraft from the weather radar display.

24. The method of removing spurious aircraft on the weather radar display of claim 17 wherein the step of differentiating spectral width further comprises the steps of:

comparing a narrow spectral width of return pulses from the spurious aircraft to wider spectral width return pulses from the weather system;

identifying the narrow spectral width as coming from the spurious aircraft; and removing the spurious aircraft from the weather radar display.

25. The method of removing spurious aircraft on the weather radar display of claim 17 comprising the steps of:

differentiating radar return length to detect and remove the spurious aircraft as a first step; and estimating a vertical gradient of reflectivity to detect and remove the spurious aircraft if not detected and removed by the first step.

* * * * *